United States Patent [19]

Shiroto et al.

[11] Patent Number: 5,193,581
[45] Date of Patent: Mar. 16, 1993

[54] SELECTOR VALVE

[75] Inventors: Yoshimi Shiroto, Yokohama; Nobuhiro Onda, Hachioji; Yoshiharu Kataoka, Yokohama; Hirotoshi Koga, Kawasaki; Akihiro Fujimori, Yokohama, all of Japan

[73] Assignees: NKK Corporation; Chiyoda Corporation, both of Japan

[21] Appl. No.: 853,072

[22] Filed: Mar. 17, 1992

[51] Int. Cl.$^5$ .............................. F16K 11/02
[52] U.S. Cl. .................... 137/625.11; 137/625.46; 137/312
[58] Field of Search ............. 137/625.11, 625.46, 137/312

[56] References Cited

U.S. PATENT DOCUMENTS

| | | | |
|---|---|---|---|
| 2,827,924 | 3/1958 | Towler et al. | 137/625.11 |
| 2,974,681 | 3/1961 | Whitehurst | 137/625.11 X |
| 3,008,490 | 11/1961 | Angelos | 137/625.11 |
| 3,253,678 | 5/1966 | Osmond | 137/625.46 X |
| 3,520,327 | 7/1970 | Claydon et al. | 137/625.11 X |
| 3,633,621 | 1/1972 | Myers | 137/625.11 |
| 3,687,163 | 8/1972 | Nickels | 137/625.11 |
| 3,752,167 | 8/1973 | Makabe | 137/625.46 X |
| 3,837,360 | 9/1974 | Bubula | 137/625.11 X |
| 4,310,022 | 1/1982 | Cohen | 137/625.11 X |
| 4,632,148 | 12/1986 | Stark, Sr. et al. | 137/625.11 X |

Primary Examiner—John Rivell
Attorney, Agent, or Firm—Lorusso & Loud

[57] ABSTRACT

A selector valve used for distributing and combining process flow. This valve comprises an open-ended cylindrical casing, a valve seat secured to the casing, an inlet hole extending coaxially with the casing through the valve seat, a plurality of outlet holes extending through the valve seat and arranged in a circle concentrical with the casing, a valve body fitted in the casing and rotatable about its axis, a U-shaped passage formed in the valve body such that its one end opens at a position coinciding with the inlet hole and its other end opens at a position meeting the circle, a spring provided within the casing for urging the valve body toward the valve seat so that the valve body is maintained in pressure contact with the valve seat, a driving mechanism for rotating the valve body through a desired angle so that the inlet hole can be in fluid communication with selected one of the outlet holes through the U-shaped passage, an annular groove formed on the surface of the valve body to define an annular, close space between the valve seat and the valve body at a position inside of the circle and a discharge hole extending through the valve seat at such a position as to be in fluid communication with the space.

3 Claims, 3 Drawing Sheets

SELECTOR VALVE

BACKGROUND OF THE INVENTION

1. Field of the Invention

This invention relates to a selector valve used for stopping process flow and selecting its direction.

2. Related Art

A conventional selector valve which has heretofore been employed is illustrated in FIG. 5. This selector valve is composed of a cylindrical casing 1', a valve hood 4' covering the casing 1' at its top, a disk-shaped valve seat 2' fixedly secured to the inner bottom of the casing 1', a disk-shaped valve body 3' rotatable about its shaft and maintained in pressure contact with the valve seat 2' by means of a spring 6', several pairs of inlet and outlet ports 9', 10' each provided oppositely on the side periphery of the casing 1', and a passage 13' formed in the lower surface of the valve body 3' so as to be in fluid communication with selected one pair of the inlet and outlet ports 9', 10'.

Since the valve body 3' of the above selector valve rotates about its spool, it is difficult to balance pressure completely. Further, the spring, which urges the valve body, is often twisted between the valve body and the valve hood. Thus, the valve body can not rotate smoothly. In order to solve this problem, there is provided a selector valve in Japanese Published Unexamined Patent Application (Kokai) No. 61-252973. In this selector valve, air pressure is used instead of spring. However, the use of the air pressure causes fluid leakage and entry of compressed air into the process flow. Accordingly, the pressure of compressed air should be always adjusted so as to correspond with the pressure of the process flow.

Additionally, the above-mentioned conventional selector valves have a further problem because it is impossible to provide a large number of pairs of inlet and outlet ports on the side periphery of the casing. Moreover, since the outlet ports are subjected to various different fluid pressure, the pressure to be applied on the contact surface of the rotating valve body with the valve seat is required to be large enough. In order to obtain the large and adjustable pressure, several springs should be combined so as to define a multiple spring. However, in this condition, frictional force between the valve body and the valve seat is increased extremely, which adversely affects the rotation of the valve body.

SUMMARY OF THE INVENTION

It is, therefore, the main object of the present invention to provide a selector valve which is operable to selectively communicate a fluid flow passage with desired one of plural fluid flow lines and which facilitates efficient operation by preventing entry of leaked fluid.

According to the present invention, there is provided a selector valve which comprises an open-ended cylindrical casing;

a stator plate fixedly secured to the casing to close its open end;

an inlet hole extending coaxially with the casing through the stator plate;

a plurality of outlet holes extending through the stator plate and arranged in a circle concentrical with the casing;

a rotor fitted in the casing and rotatable about an axis thereof extending coaxially with the casing;

a U-shaped passage formed in the rotor such that one end of the passage opens at a position coinciding with the inlet hole of the stator plate and the other end of the passage opens at a position meeting the circle;

means provided within the casing for urging the rotor toward the stator plate so that the rotor is maintained in pressure contact with the stator plate;

means for rotating the rotor through a desired angle so that the inlet hole can be in fluid communication with selected one of the outlet holes through the U-shaped passage;

an annular groove formed on the surface of the rotor to define an annular, closed space between the stator plate and the rotor at a position inside of the circle; and a discharge hole extending through the stator plate at such a position that the discharge hole is in fluid communication with the space.

In a preferable selector valve, contact surface at which the rotor and the stator plate are in a sliding contact and the peripheral side surface of the rotor are coated with one of ceramic and polytetrafluoroethylene.

According to the selector valve of the present invention, the area of the contact surface is decreased. Accordingly, although high pressure applied on the unit area of the contact surface can be kept unchanged, the total pressure applied for the contact of the rotor and the stator plate is decreased. Thus, since the rotator can be rotated with reduced torque because of reduced frictional resistance, means for urging the rotor can be prevented from being twisted. On the other hand, in the operation of conventional selector valves, springs as means for urging the rotor are often twisted. The structure of this selector valve facilitates leaked fluid produced at the contact surface between the rotor and the stator plate to be collected in the space and discharged. Accordingly, contamination of the rotator with the leaked fluid and entry of the leaked fluid into the distributed flow are both prevented. Particularly, in this selector valve, fluid leakage can be allowed to some degree due to the space. Precisely, the pressure applied on the contact surface of the rotor with the stator plate is not required to be so high as the pressure applied for complete sealing.

BRIEF DESCRIPTION OF THE DRAWINGS

Other objects, features and advantages of the invention will become apparent from the detailed description of the preferred embodiments of the invention which follows, when considered in light of the accompanying drawings, in which.

DETAILED DESCRIPTION OF PREFERRED EMBODIMENT

Figure 1:
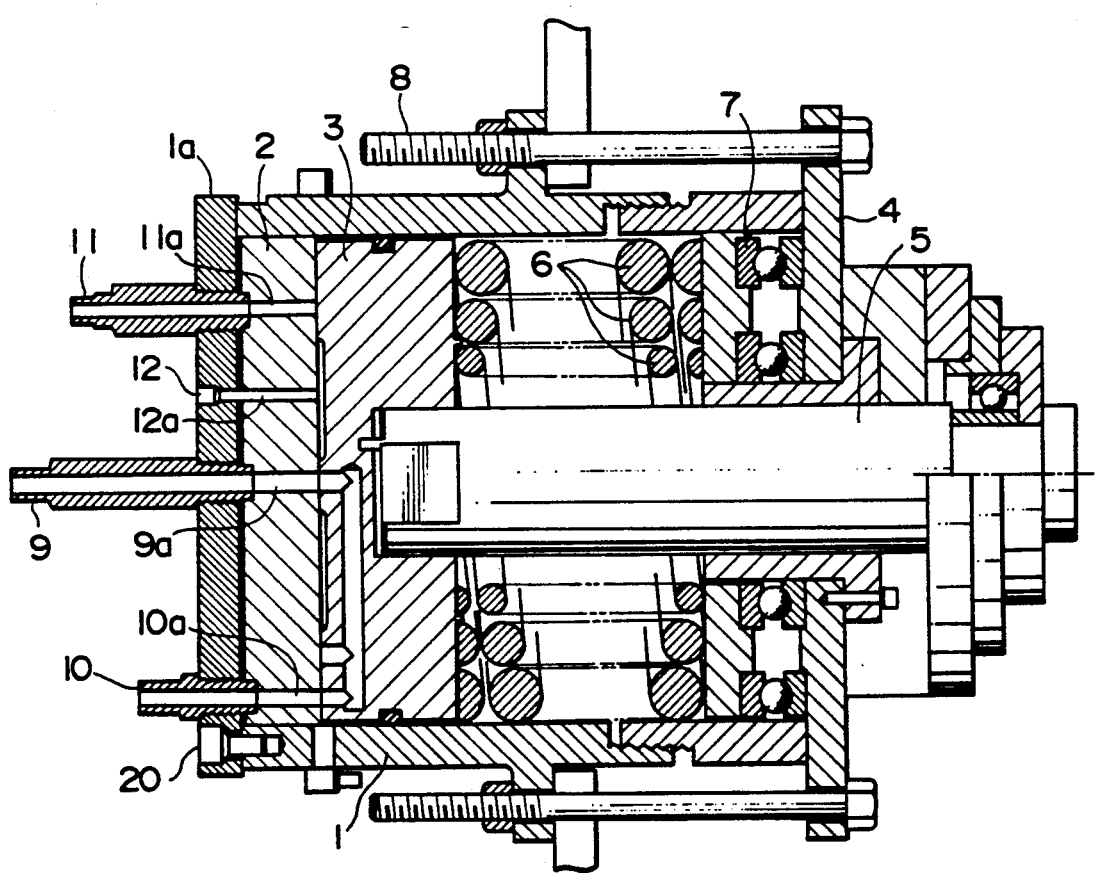
FIG. 1 is a sectional elevation showing one embodiment of the selector valve of the present invention.

Referring now to FIG. 1, the reference numeral 2 designates a stator plate which serves as a valve seat and which is fixedly secured to a cylindrical casing 1 to close the open end of the casing 1. A rotor 3 which serves as a valve body is accommodated within the casing 1. A valve hood 4 covers the other open-end of the casing 1. A valve shaft 5 is secured to the valve body 3 for rotation therewith. The fore end portion of the shaft 5 is extended through the valve hood 4 and connected to a driving mechanism (not shown). This mechanism works as means for rotating the valve body 3 through a desired angle. A multiple spring 6 as means for urging the valve body 3 toward the valve seat 2 applies force on the valve body 3. The both sides of the spring 6 in the direction being vertical to the shaft 5 are formed so as to be flat. A thrust bearing 7 is provided within the casing 1 so that one side of the spring 6 is maintained in pressure contact with the inner side of the valve hood 4. The casing 1 and the valve hood 4 is connected by a bolt 8. The pressure applied on the contact surface of the valve body 3 with the valve seat 2 can be adjusted with the bolt 8. Designated as 1a is an end plate fixedly secured to the casing 1 for constituting part of the stator plate 2.

Figure 2:
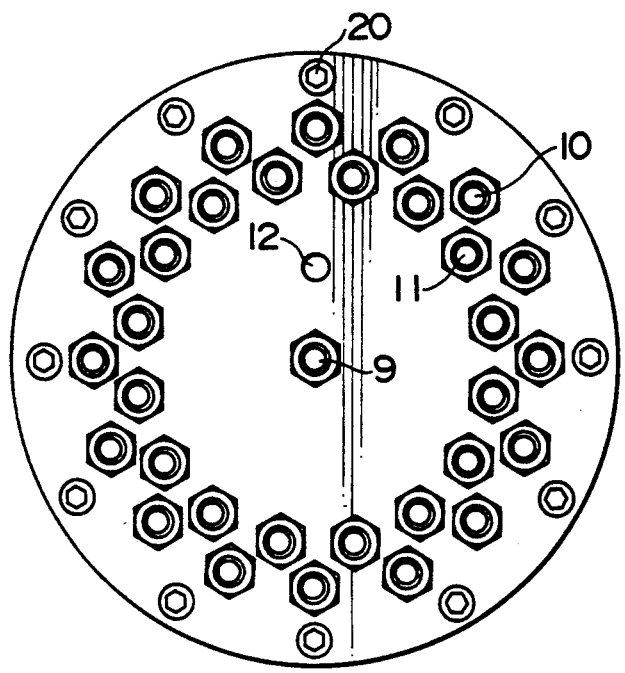
FIG. 2 is a front view showing inlet and outlet ports arrangement of the selector valve of FIG. 1.

As shown in FIG. 2, the end plate 1a is provided with an inlet port 9 at its center and a plurality of outlet ports 10 and 11 at the periphery thereof. In the specific embodiment shown, the outlet ports 10 and 11 are arranged in two, outer and inner circles concentrical with the casing 1. Further, the outlet ports 10 are angularly displaced relative to the angular orientation of outlet ports 11. A discharged hole 12 is also provided on the end plate 1a of the casing 1 near the inlet port 9. The end plate 1a is fixed to the rim of the casing 1 by bolts 20. Further, through-holes 9a, 10a, 11a, 12a are formed in the valve seat 2. The inlet port 9, outlet ports 10 and 11 and discharge port 12 are located at positions coinciding with the through-holes 9a, 10a, 11a and 12a, respectively, so as to be in fluid communication therewith.

Figure 3:
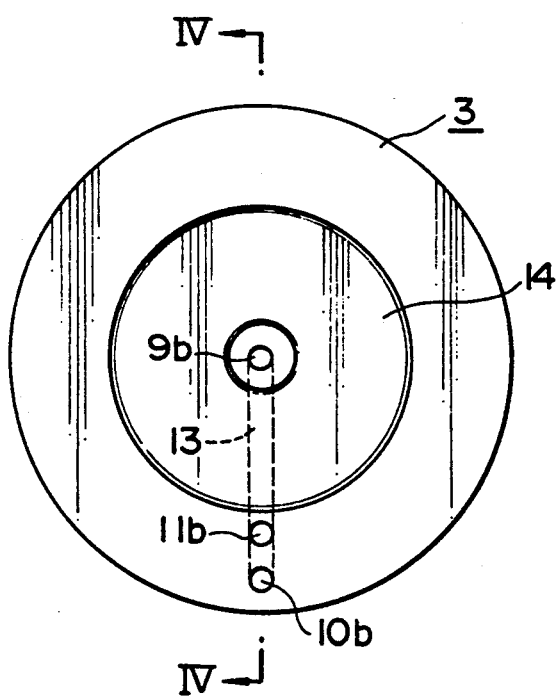
FIG. 3 is a front view of a valve body of the selector valve of FIG. 1.
Figure 4:
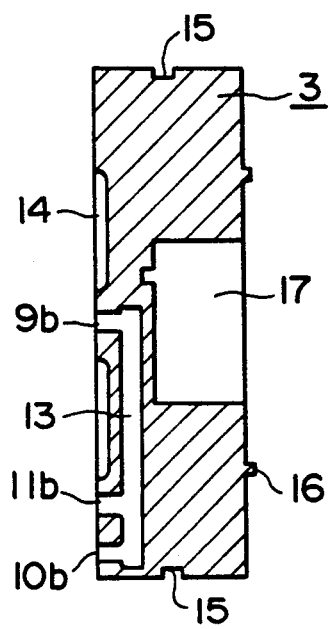
FIG. 4 is a cross-sectional view taken on the line IV—IV in FIG. 13.
Figure 5:
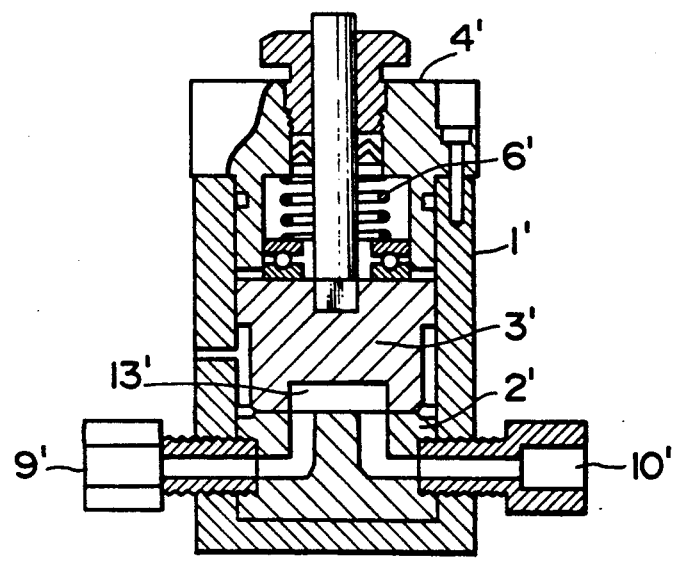
FIG. 5 is a cross-sectional view of one example of conventional selector valves.

As shown in FIGS. 3 and 4, the contact surface of the valve body 3 with the valve seat 2 is provided with three holes 9b, 10b and 11b at positions corresponding to the through-holes 9a, 10a and 11a, respectively. Namely, the holes 9b, 10b and 11b are aligned on the same line and the distances between the holes 9b and 11b and between the holes 9b and 10b are equal to the radii of the inner and outer circles along which the through-holes 11a and 10a are arranged, respectively. As shown in FIG. 4, the holes 9b, 10b and 11b mutually communicate through a passage 13.

As shown in FIGS. 3 and 4, the contact surface of the valve body 3 with the valve seat 2 is provided with an annular groove 14 to define an annular, closed space between the valve seat 2 and the valve body 3 at a position inside of the inner circle of the outlet holes 11. The above discharge hole 12a extends through the valve seat 2 at such a position as to be in fluid communication with the annular space. In FIG. 4, a cavity 15 is formed on the peripheral side surface of the valve body 3 to place and O-ring. Then, a ring-shaped projection 16 formed on the spring-side surface of the valve body 3 regulates exactly the location of the spring 6. A square hole 17 is formed for setting the shaft 5. When the valve body 3 rotates, the O-ring fitted in the cavity 15 reduces sliding resistance produced between the peripheral side surface of the valve body 3 and the inner surface of the casing 1. Further, fluid can be prevented from leaking into the spring-side in the casing 1 due to the O-ring.

According to the selector valve of the present invention, when the inlet port 9 is connected to a feed pipe and the outlet ports 10 and 11 are connected to a plurality of distribution pipes, the liquid feed from the feed pipe can be distributed surely to a desired one of the distribution pipes. In this embodiment, in cross section, every outlet port 10 on the outer circle is always located so as not to be on any line defined between an outlet port 11 on the inner circle and an inlet port 9. Accordingly, there can be provided a large number of through-holes 10a and 11a in the valve seat 2. Thus, the driving mechanism rotates the valve body 3 through the desired angle so that the inlet port 9 can be in fluid communication with a selected one of the outlet ports 10 and 11 through the passage 13. Therefore, the feed can be distributed one by one from one outlet port 10 to the adjacent outlet port 11. Further, in the present invention, when the shaft 5 is rotated, the spring 6 is also rotated with the valve body 3. Not only by the reduced frictional resistance but also from this aspect, the spring 6 can be prevented from being twisted.

As explained before, the area of contact surface of the valve body 3 with the valve seat 2 is reduced by the provision of the annular groove 14 formed radially inward of the holes 9b and 11b. Accordingly, the friction in the contact surface can be reduced so that the rotation torque of the valve body 3 can be reduced extremely. At the same time, the contact pressure between the valve body 3 and the valve seat 2 can be decreased. Further, since the discharge hole 12 is provided in fluid communication with the groove 14, the fluid leaked between the contact surfaces of the valve body 3 and the valve seat 2 can be collected in the groove 14 and discharged through the discharge hole 12, so that entry of the leaked fluid into the distributed flow can be prevented.

When the outlet ports 10 and 11 are connected to a plurality of feed pipes for a plurality of different feeds, a desired one of the feeds can be selectively introduced into the outlet feed pipe connected to the inlet port 9.

Additionally, in a preferred embodiment, the surface at which the valve body 3 and the valve seat 2 are in sliding contact and the peripheral side surface of the valve body 3 are coated with ceramic or Teflon (trademark for polytetrafluoroethylene). Because of this coating, the surfaces can be prevented from wear to a great degree. Further, the surfaces are excellent in heat resistance, corrosion resistance and sealing effect.

In the above embodiment, the outlet ports 10 and 11 are arranged in two, outer and inner circles. This is not, however, critical. The outlet ports may be arranged in only one circle or in three or more circles, with the number and location of the holes of the rotor 3 being changed, accordingly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A selector valve comprising:
   an open-ended cylindrical casing;
   a stator plate fixedly secured to said casing to close said open end thereof;
   an inlet hole extending coaxially with said casing through said stator plate;

a plurality of outlet holes extending through said stator plate and arranged in a circle concentrical with said casing;

a rotor fitted in said casing and having a cylindrical peripheral surface and a flat contact surface in contact with said stator plate and rotatable about an axis thereof extending coaxially with said casing;

a radially-extending passage formed in said rotor such that one end of said passage is open at a position coinciding with said inlet hole of said stator plate and the other end of said passage is open at a position on said circle;

means provided within said casing for urging said rotor toward said stator plate so that said rotor is maintained in pressure contact with said stator plate;

means for rotating said rotor through a desired angle so that said inlet hole can be in fluid communication with a selected one of said outlet holes through said radially extending passage;

collection means for collecting fluid leaking between said contact surface of said rotor and said stator plate, said collection means including an annular groove formed on said contact surface of said rotor to define an annular, closed space between said stator plate and said rotor at a position inside of said circle; and a discharge hole extending through said stator plate in fluid communication with said annular, closed space.

2. A selector valve according to claim 1, wherein contact surface at which said rotor and said stator plate are in a sliding contact and the peripheral side surface of said rotor are coated with one of ceramic and polytetrafluoroethylene.

3. A selector valve in accordance with claim 1 comprising first and second pluralities of outlet holes arranged in first and second circles, respectively, concentric with said casing, said outlet holes in said first circle being angularly displaced with respect to the angular orientation of the outlet holes in said second circle, and wherein said radially extending passage provides fluid communication between said inlet hole on said stator plate and plural openings in said flat contact surface coinciding, respectively, with said first and second circles.

* * * * *